United States Patent

[11] 3,576,382

| [72] | Inventor | Harald Finnstrand |
| | | 35 Elm Tree Lane, Pelham, N.Y. 10803 |
| [21] | Appl. No. | 802,121 |
| [22] | Filed | Feb. 25, 1969 |
| [45] | Patented | Apr. 27, 1971 |

[54] FUEL BURNER
7 Claims, 10 Drawing Figs.

[52] U.S. Cl. .................................................. 431/208
[51] Int. Cl. ..................................................... F23d 11/44
[50] Field of Search........................................... 431/208; 48/103

[56] References Cited
UNITED STATES PATENTS

| 3,190,071 | 6/1965 | Negre .......................... | 431/208X |
| 3,234,991 | 2/1966 | Fischbach .................... | 431/208 |
| 3,330,325 | 7/1967 | Brockman et al............. | 431/208 |
| 3,230,947 | 1/1966 | Finnstrand ................... | 126/24 |

Primary Examiner—Edward G. Favors
Attorney—Dan R. Sadler

ABSTRACT: A fuel burner for a cooking unit comprises a body adapted for the flow of liquid fuel into same and adapted for vaporizing the fuel before it reaches a nozzle for vaporized fuel. The burner also includes at least one air-intake aperture therein for mixing air and fuel vapor to form a combustible mixture. The burner also includes electrical heating means in proximity to the burner body and the mixing chamber for preheating primarily the burner body and also the mixing chamber to sustain vaporization of the fuel in the burner body.

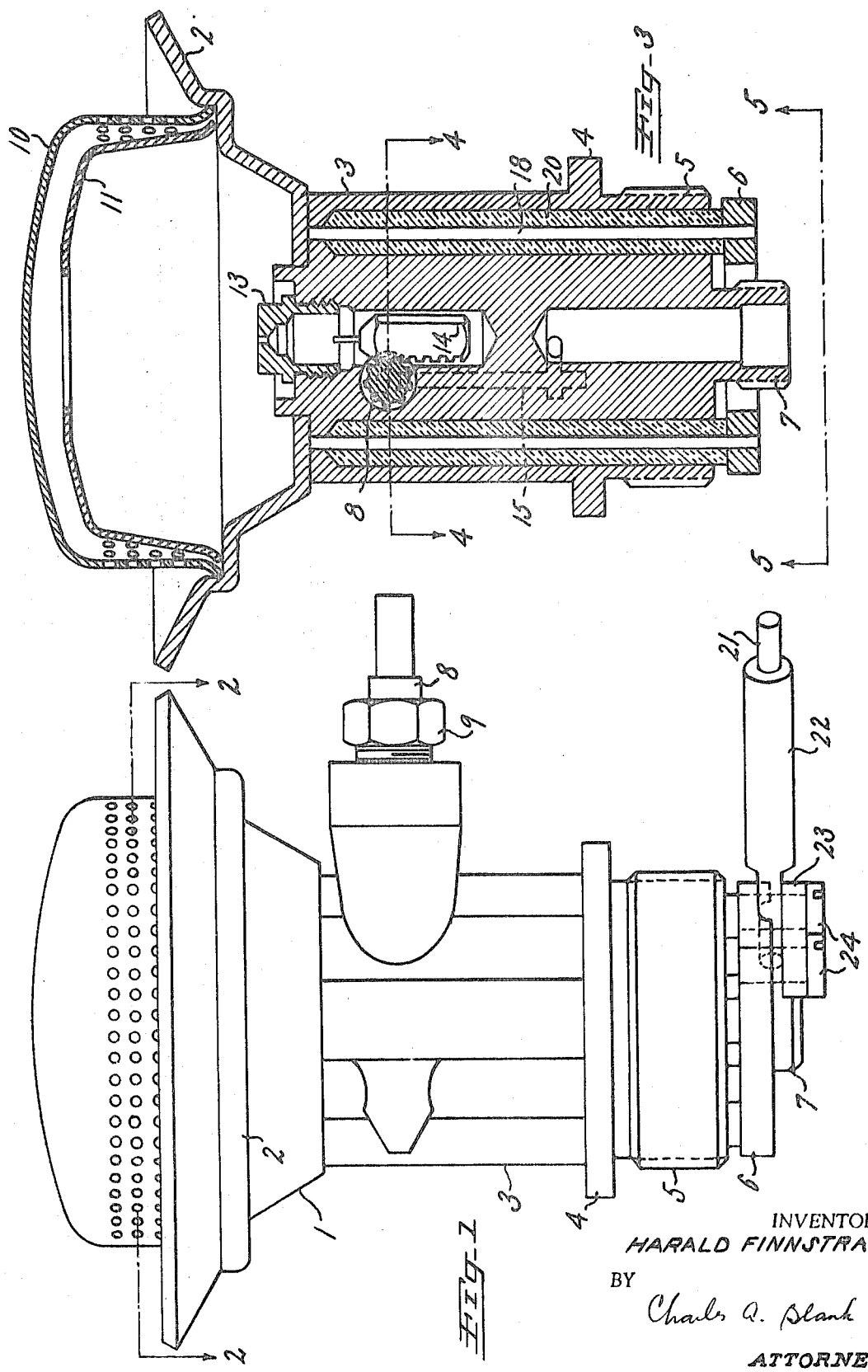

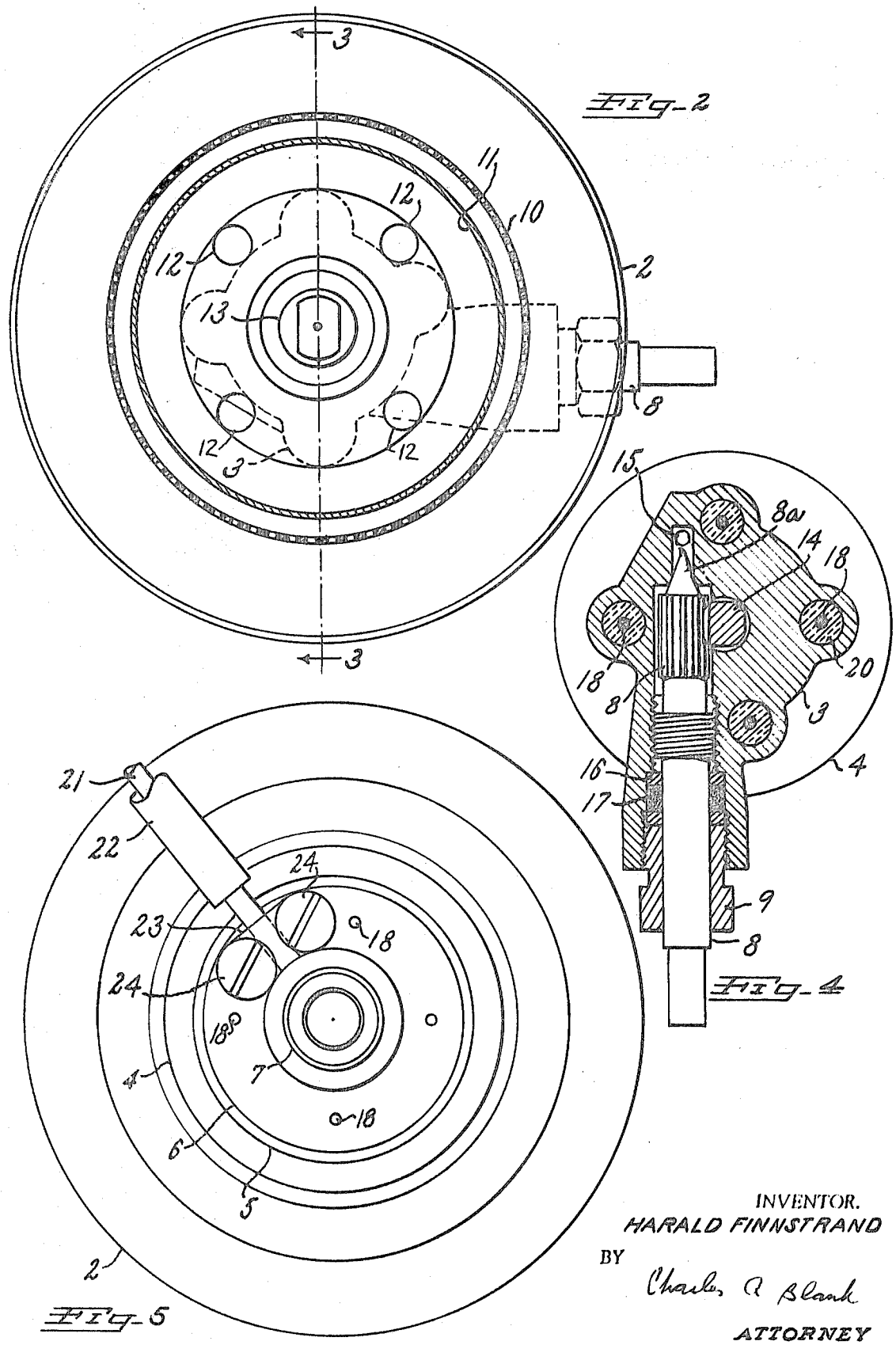

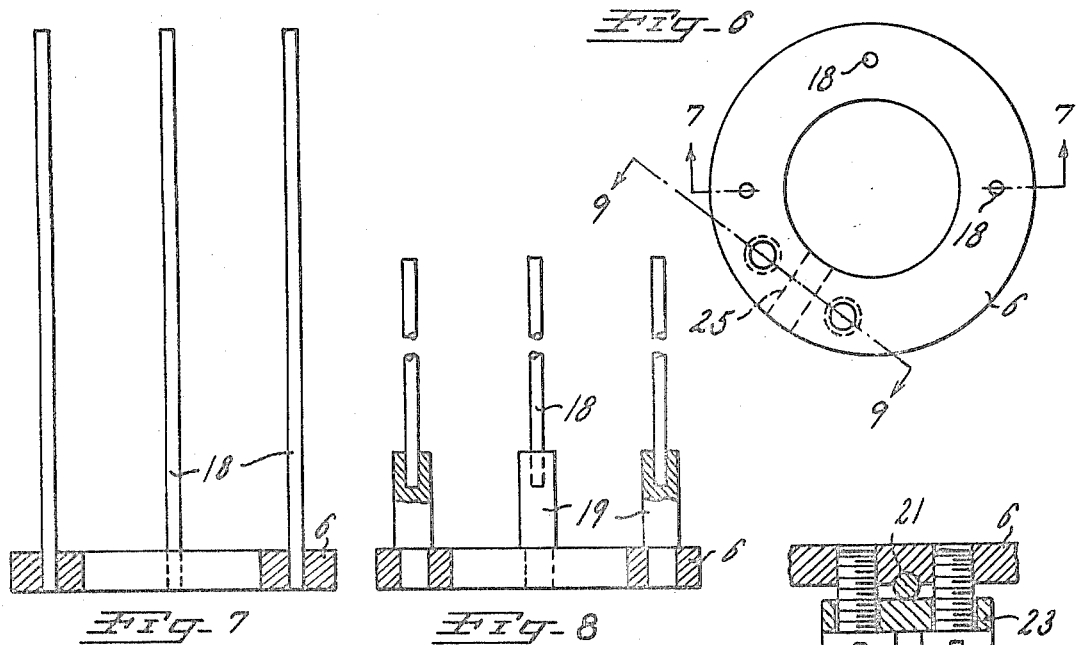
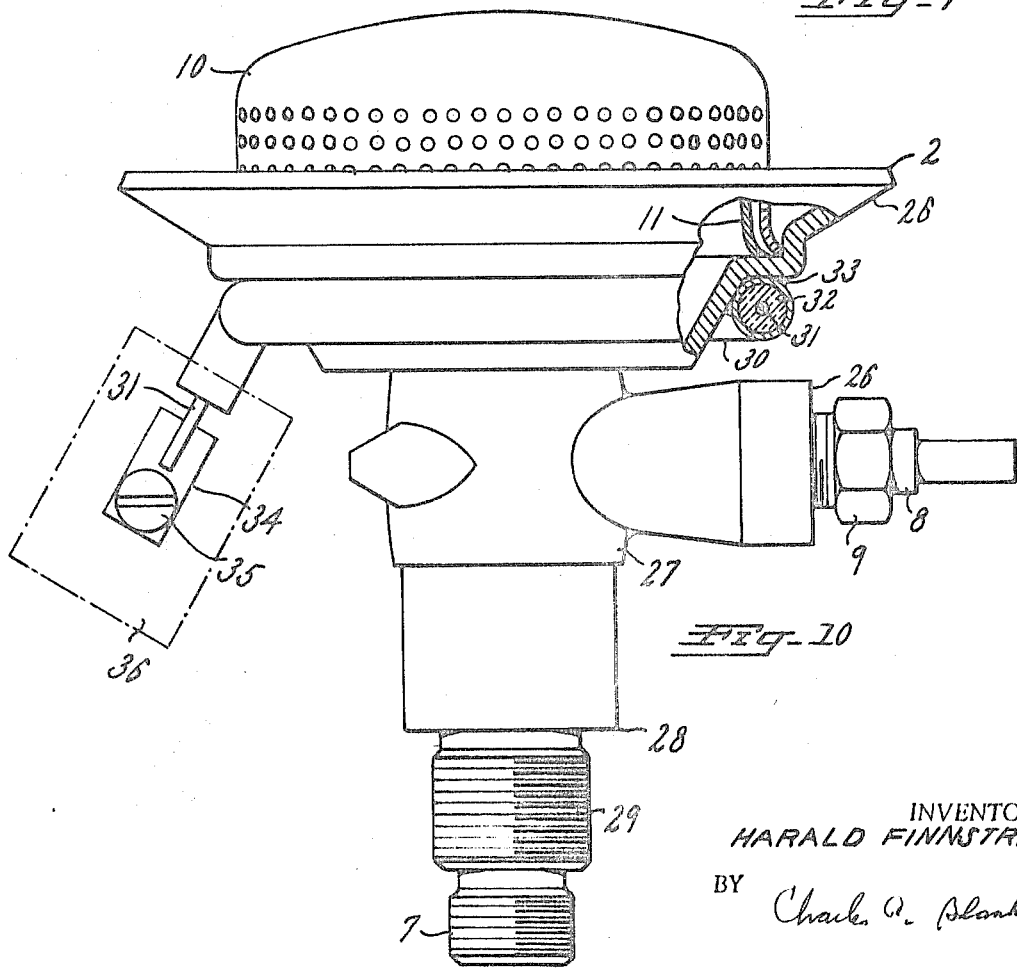

3,576,382

1

FUEL BURNER

This invention relates to a fuel burner for a cooking unit and, more particularly, to a fuel burner for a galley stove of the type described and claimed in U.S. Pat. No. 3,230,947 issued in my name.

Fuel burners fed by a liquid fuel such as alcohol require preheating to vaporize the alcohol before ignition of the burner. This may require pumping liquid alcohol from a pressurized tank and igniting the liquid priming alcohol to heat the burner. This may involve delay while the fuel is being pumped to the burner and considerable delay while the priming alcohol is being consumed.

It is an object of the present invention, therefore, to provide a new and improved fuel burner for a cooking unit which avoids one or more of the above-mentioned disadvantages of prior fuel burners.

It is another object of the present invention to provide a new and improved fuel burner which does not require preheating by means of liquid fuel.

In accordance with the invention, a fuel burner for a cooking unit comprises a body adapted for the flow of a liquid fuel into same and adapted for vaporizing the fuel before it reaches a nozzle for vaporized fuel. The burner also includes a mixing chamber having at least one air-intake aperture therein for mixing air and fuel vapor to form a combustible mixture. The burner also includes electrical heating means in proximity to the burner body and the mixing chamber for preheating primarily the burner body and also the mixing chamber to sustain vaporization of the fuel in the burner body.

For a better understanding of the present invention, together with other and further objects thereof, reference is made to the following description taken in connection with the accompanying drawings, and its scope will be pointed out in the appended claims.

Referring now to the drawings:

FIG. 1 is a view, in elevation, of a burner constructed in accordance with the invention;

FIG. 2 is a sectional view of the FIG. 1 burner taken on line 2-2 of FIG. 1 to show a nozzle for vaporized fuel, and air intake apertures in the burner flange;

FIG. 3 is a sectional view of the burner taken along line 3-3 of FIG. 2 with burner caps also shown in section;

FIG. 4 is a view, in section, of the FIG. 3 burner taken along line 4-4 of FIG. 3 with the burner body shown in full line construction;

FIG. 5 is a bottom view of the FIG. 3 burner along line 5-5 of FIG. 5 with the body of the burner shown in full line construction;

FIG. 6 is a top view of a bus-ring having threaded holes for screws of wire lead connections and a groove to receive an external wire lead;

FIG. 7 is a vertical section taken along line 7-7 of the FIG. 6 bus-ring, showing the wire leads attached thereto;

FIG. 8 is a vertical section of an alternate construction of bus-ring and heating elements, showing an alternate configuration of the heating wires;

FIG. 9 is a vertical section of the bus-ring of FIG. 6, taken along 9-9 of FIG. 6, to show the connection of an external current lead wire to the bus-ring;

FIG. 10 is a view, in elevation and partly in section, of a modified burner constructed in accordance with the invention.

Referring now more particularly to FIGS. 1 and 2 of the drawings, a fuel burner 1 constructed in accordance with the invention comprises a burner flange 2 attached to a burner body 3 adapted for the flow of liquid fuel therethrough. The burner has a mounting flange 4 and a threaded part 5 suitable for a mounting nut. A bus-ring described in greater detail hereinafter is utilized to connect an electrical power supply wire lead to the burner as will be described hereinafter. A threaded sleeve 7 for the connection of a fuel tube extends from the bottom of the burner.

2

Referring also to FIGS. 3 and 4, a control valve spindle 8 is utilized to control the flow of fuel through the burner and is positioned within a suitable nut 9. A suitable ring 16 surrounds the needle valve spindle 8 and packing 17 is provided between the ring 16 and the nut 9.

As mentioned previously, the burner has a mixing chamber within caps 10 and 11, having at least one air intake aperture 12, and preferably four such apertures as shown in FIG. 2, for mixing air and fuel vapor to form a combustible mixture. A suitable nozzle 13 for vaporized fuel is positioned within the body 3. A rack 14 with a cleaning needle for the nozzle 13 is also controlled by the spindle 8, which has gear teeth hobbed into it to engage the rack. In an extreme position of the spindle 8, the rack moves into the nozzle but may be otherwise positioned in intermediate position during operation of the burner. The passage for fuel extends through the sleeve 7, passageway 15 controlled by the needle valve 8a of FIG. 4 attached to the spindle 8, and to the nozzle 13 through the cavity surrounding the needle valve and the rack.

At least one resistance wire, and preferably four such wires 18, extends through the body of the burner to the mixing chamber. As represented in FIGS. 3 and 4, the resistance wires are suitably brazed to the burner body at the flange 2. The other ends of the resistance wires are conductively attached to the bus-ring 6, as more clearly represented in FIGS. 5, 6 and 7.

Another embodiment of the resistance wires is represented in FIG. 8 in which the resistance of the wire is higher at the portion of the wire in closest proximity to the mixing chamber and is lower at the portion adjacent the bus-ring. This may be readily accomplished by utilizing a larger diameter resistance wire 19 at the region adjacent the bus-ring 6. This results in greater heating of the upper region of the burner adjacent the mixing chamber from a low voltage source. As represented in FIG. 3, a suitable ceramic insulator 20 surrounds each resistance wire.

As represented in FIGS. 5 and 9, a suitable lead 21 for the current supply is surrounded by an insulator 22 and attached under a pressure plate 23 to the bus-ring 6 by means of adjustable screws 24. A groove 25 to receive the wire 21 appears in broken line construction in FIG. 6.

Considering now the operation of the burner with reference to FIGS. 1 to 4, inclusive, current is supplied through conductor 21 to the bus-ring 6 through the resistance wires 18 to the body at the flange 2 of the burner which is suitably grounded on the body shell of the stove. The current may be supplied by a suitable low voltage, for example, 12 or 24 volts. As the current flows through the resistance wires 18, it preheats the body of the burner and the mixing chamber in a very short time, for example, 15 seconds. Fuel may then be caused to flow through the sleeve 7 and the passageway 15 to the cavity surrounding the needle valve 8a, which may be unblocked by the rotation of the spindle 8. From the cavity surrounding the needle valve 8a, the fuel flows through the cavity surrounding the cleaning rack 14 and through the nozzle 13 into the mixing chamber. The fuel is vaporized during its passage through the passageway 15 and the cavity surrounding the rack 14 before it reaches the nozzle 13. In the mixing chamber the fuel vapor and combustion air mix and may be ignited outside the cap 10 in the same manner as a gas burner immediately after the preheating time has elapsed.

Referring now more particularly to FIG. 10 of the drawings, a modified burner 26 is represented. The burner body 27, the mounting flange 28 and the threaded part 29 for the mounting nut have been modified as represented in FIG. 10. Moreover, no heating wires extend through the burner body as in the FIG. 1 burner. A suitable resistance wire 31 enclosed in a ceramic insulator 32 and having a metal shell 33 extends around the burner flange 2 and is silver brazed thereto. The ends of the resistance wire extend into suitable contact clips, such as clip 34 maintained in position by a contact screw 35 extending within a suitable ceramic insulator 36. The heating element preferably is suitable for use with a 110 volt or 220 volt supply. In the FIG. 10 burner all of the preheating heat is supplied to the burner flange through which it is conducted to the burner body which causes vaporization of the fuel in the same manner as previously described for the FIG. 1 burner, in a short period of time, for example, 15 seconds. The operation of the burner is similar to the operation of the FIG. 1 burner.

The fuel tank (not shown) may be pumped, for example, 20 or more times to pressurize the tank to, for example, 15 to 20 pounds per square inch prior to initiating the preheating procedure and no pumping is required during the preheating time.

While there have been described what are at present believed to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

I claim:

1. A fuel burner for a cooking unit comprising:
   a heater body adapted for the flow of liquid fuel therethrough and for vaporizing the fuel therein;
   a mixing chamber being disposed to receive the vaporized fuel from said heater body and having at least one air intake aperture therein for mixing air and fuel vapors to form a combustible mixture; and
   electrical heating means disposed in proximity to said heater body for preheating said heater body for sustaining vaporization of the fuel therein, said electrical heating means comprising at least one resistance wire extending through said body of the burner to said mixing chamber and having a higher resistance at the portion of said wire in closest proximity to said mixing chamber.

2. A fuel burner for a cooking unit comprising:
   a heater body adapted for the flow of liquid fuel therethrough and adapted for vaporizing the fuel therein;
   a mixing chamber being disposed to receive the vaporized fuel from said heater body and having at least one air intake aperture therein for mixing air and fuel vapors to form a combustible mixture; and
   electrical heating means disposed in proximity to said heater body for preheating said burner body for sustaining vaporization of the fuel in said burner body, said electrical heating means including a plurality of resistance wires in a common bus-ring disposed around the bottom of said burner, one end of said resistance wires being conductively connected to said bus-ring and the other end of said resistance wire being connected to said mixing chamber.

3. A fuel burner for a cooking unit or the like comprising:
   a body means defining a sleeve therethrough for receiving fuel under pressure;
   a nozzle being disposed on one end of the sleeve of said body;
   a heating means disposed in proximity of said body for vaporizing the fuel as it leaves said nozzle said heating means including a plurality of resistance wires and a common bus-ring around the bottom of said burner, one end of said resistance wires being conductively connected to said bus-ring; and
   a mixing chamber disposed to receive the vaporized fuel from said nozzle and having an air intake aperture therein for mixing air therefrom and the vaporized fuel from said nozzle to form a combustible mixture, the other end of said resistance wires being connected to said mixing chamber.

4. The apparatus as defined in claim 3 wherein, said mixing chamber including:
   a flange being disposed about said nozzle and in thermal communication with said body;
   a first cap disposed over said flange; and
   a second cap disposed over said first cap and defining an air chamber therebetween, said second cap having a plurality of holes therein for dispensing said vaporized fuel and air mixture for igniting therefrom said flange being in thermal communication with the ignited fuel from said second cap.

5. The apparatus as defined in claim 4 wherein, said heating means comprising at least one resistance wire extending through said body means to said mixing chamber.

6. The apparatus as defined in claim 4 wherein, said electrical heating means comprising at least an electrical wire extending about the flange of said mixing chamber.

7. The apparatus as defined in claim 4 wherein, said heating means including a plurality of resistance wires and a common bus-ring around the bottom of said burner, one end of said resistance wires being conductively connected to said bus-ring and the other end of said resistance wires being connected to said mixing chamber.